United States Patent
Liao et al.

(10) Patent No.: US 6,697,233 B2
(45) Date of Patent: Feb. 24, 2004

(54) HIGH DENSITY RECORDING, DUAL STRIPE MR (DSMR) HEAD FOR ACHIEVING ANTI-PARALLEL EXCHANGE COUPLING WITH ONE BIASED LAYER HAVING LOW COERCIVITY

(75) Inventors: Simon H. Liao, Fremont, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 152 days.

(21) Appl. No.: 09/946,986

(22) Filed: Sep. 6, 2001

(65) Prior Publication Data

US 2002/0067578 A1 Jun. 6, 2002

Related U.S. Application Data

(62) Division of application No. 09/369,289, filed on Aug. 6, 1999, now Pat. No. 6,308,400.

(51) Int. Cl.[7] .................................................. G11B 5/31
(52) U.S. Cl. ....................................................... 360/315
(58) Field of Search .............................. 360/315, 324.2, 360/324.12; 428/682; 29/603.14

(56) References Cited

U.S. PATENT DOCUMENTS

| | | | |
|---|---|---|---|
| 5,262,914 A | 11/1993 | Chen et al. | 360/327.32 |
| 5,406,433 A | 4/1995 | Smith | 360/315 |
| 5,561,896 A | 10/1996 | Voegeli et al. | 29/603.08 |
| 5,684,658 A | 11/1997 | Shi et al. | 360/315 |
| 5,696,654 A | 12/1997 | Gill et al. | 360/315 |
| 5,766,780 A * | 6/1998 | Huang et al. | 428/682 |
| 5,859,753 A | 1/1999 | Ohtsuka et al. | 360/314 |
| 5,914,839 A * | 6/1999 | Matsuzono et al. | 360/315 |
| 6,175,477 B1 * | 1/2001 | Lin et al. | 360/324.12 |
| 6,308,400 B1 * | 10/2001 | Liao et al. | 29/603.14 |
| 6,341,053 B1 * | 1/2002 | Nakada et al. | 360/324.2 |

OTHER PUBLICATIONS

Ashar, Magnetic Disk Drive Technology: Heads, Media, Channel, Interfaces, and Integration, IEEE Press Inc., (1996), pp. 142–146.

* cited by examiner

Primary Examiner—Tianjie Chen
(74) Attorney, Agent, or Firm—George O. Saile; Stephen B. Ackerman; Graham S. Jones, II

(57) ABSTRACT

A method of forming a DSMR head comprises the steps of forming a first ferromagnetic (FM) strip on a substrate with a first anti-FM (AFM) pinning layer over a portion of the first ferromagnetic strip, the first AFM pinning layer being composed of a first material. Then perform a first high temperature annealing step. Form a non-magnetic layer over the strip and the pinning layer. Then form a second FM strip on the non-magnetic layer, and form a second AFM pinning layer over a portion of the second FM strip, with a second AFM pinning layer being composed identically of the first material. Perform a second high temperature annealing step on the first and second FM strips and the first and second pinning layers and the intermediate non-magnetic layer in the presence of a second magnetic field antiparallel to the first magnetic field. A head with NiFe FM strips and FeMn or MnPt, etc, AFM layers for both strips is provided.

5 Claims, 4 Drawing Sheets

HIGH DENSITY RECORDING, DUAL STRIPE MR (DSMR) HEAD FOR ACHIEVING ANTI-PARALLEL EXCHANGE COUPLING WITH ONE BIASED LAYER HAVING LOW COERCIVITY

This is a division of patent application Ser. No. 09/369,289, now U.S. Pat. No. 6,308,400, filing date Aug. 6, 1999, High Density Recording, Dual Stripe Mr (Dsmr) Head And Method For Achieving Anti-Parallel Exchange Coupling With One Biased Layer Having Low Coercivity, assigned to the same assignee as the present invention.

BACKGROUND OF THE INVENTION

1. Field of the Invention

This invention relates to magnetic recording, dual stripe, magnetoresistive (DSMR) read heads and more particularly to methods of forming such read heads.

2. Description of Related Art

Askar, Magnetic Disk Drive Technology: Heads, Media, Channel, Interfaces And Integration, IEEE Press Inc., (1996) pp. 142–146, describes DSMR sensors and exchange biasing.

U.S. Pat. No. 5,262,914 of Chen et al. for "Magnetoresistive Head with Enhanced Exchange Bias Field" describes a MnFe AntiFerro-Magnetic (AFM) bias layer in direct contact with a NiFe MR layer which in turn is in physical contact with an interdiffusion layer composed of a noble metal, with a 240° C., 7 hour annealing process for thermally forming an interface between the AFM layer and the MR layer which produces an exchange bias field to the MR layer.

U.S. Pat. No. 5,406,433 of Smith for "Dual Magnetoresistive Head for Reproducing Very Narrow Track Width Short Wavelength Data" describes at Col. 5, line 54 to Col. 6, line 33 longitudinal biasing of MR elements in opposite directions by pinning at the ends of the elements by use of patterned exchange biasing. After an MR element is deposited a patterned exchange layer of FeMn is deposited over the two ends of the first MR element. Either during (1) deposition of the AFM FeMn exchange layer or (2) after annealing, a longitudinal magnetic field is applied to the structure to orient the exchange bias field in the selected longitudinal direction. After formation of a spacer and the second MR element, a second patterned ferrimagnetic (TbCo) exchange layer of a different material from the AFM FeMn layer is deposited over the two ends of the second MR element. A post deposition field in the opposite direction from the first field is applied to the TbCo layer so that there is opposite magnetization in the two MR elements.

U.S. Pat. No. 5,561,896 of Voegeli et al. for "Method of Fabricating Magnetoresistive Transducer" teaches a Selective Pulse Interdiffusion (SPI) process during which areas destined to become biasing segments of an MagnetoResistive (MR) head are selectively heated using one or more electrical current pulses of short duration.

U.S. Pat. No. 5,684,658 of Shi et al. for "High Track Density Dual Stripe Magnetoresistive (DMSR) Head" shows a DSMR having a first anti-ferromagnetic (AFM) longitudinal biasing layer and a second anti-ferromagnetic (AFM) longitudinal biasing layer that are parallel, in contrast with the present invention as described at Col. 8, lines 20–39. The AFM materials include NiMn, CoCr, CoCrPt, CoCrTa, CoCrNi, CoCrPtNi, CoCrNiTa, etc.

U.S. Pat. No. 5,696,654 of Gill et al. for "Dual Element Magnetoresistive Sensor with Anti-Parallel Magnetization Directions for Magnetic State Stability" describes a dual MR element sensor with two MR elements separated by a high resistivity, conductive spacer element. A layer of a hard bias material abutting the track edges of the MR2 element biases it longitudinally in one direction. The MR1 layer is biased by a pair of exchange bias layers (NiFe/NiMn or NiFe/NiO) abutting the track edges of the MR1 strip by exchange coupling in an opposite, i.e. antiparallel longitudinal direction.

U.S. Pat. No. 5,859,753 of Ohtsuka et al. for "Spin Valve Magnetoresistive Head with Spun Valves Connected in Series" that includes first and second magnetization pinning layers which are anti-parallel to each other including AFM layers one of which is NiMn that has a high blocking temperature and one of which if FeMn that has a low blocking temperature. At col. 10, lines 10–19". . . NiMn having a high blocking temperature is formed as the first antiferromagnetic layer . . . on the first magnetization pinning layer . . . at a temperature of 200° to 300° C. The NiMn is grown in a magnetic field $H_{01}$ applied in the first direction. Thereafter, . . . FeMn is formed as the second antiferromagnetic layer . . . on the second magnetization spinning layer . . . at a temperature of around 160° C. While applying a magnetic field $H_{02}$ in the direction opposite to the first direction, the growth of FeMn is carried out." At Col. 10, lines 37–60 it is pointed out that an alternative process can employ a step of heating to the higher blocking temperature and application of field $H_{01}$ which is followed by a step of heating to the lesser blocking temperature temperature and application of field $H_{02}$ can be deferred until after formation of the AFM layers.

SUMMARY OF THE INVENTION

In accordance with this invention a method is provided for forming a DSMR head including forming a first ferromagnetic (FM) strip on a substrate with a first anti-FM (AFM) pinning layer over a portion of the first ferromagnetic strip, the first AFM pinning layer being composed of a first material. Then perform a first high temperature annealing step. Form a non-magnetic layer over the strip and the pinning layer, and form a second FM strip on the non-magnetic layer. Form a second AFM pinning layer over a portion of the second FM strip, with a second AFM pinning layer being composed identically of the first material. Perform a second high temperature annealing step on the first and second FM strips and the first and second pinning layers and the intermediate non-magnetic layer in the presence of a second magnetic field antiparallel to the first magnetic field. A head with NiFe FM strips and FeMn, or MnPt, etc, AFM layers for both strips is provided. Preferably, the first and second magnetoresistive strips are composed of NiFe, and the first and second antiferromagnetic pinning layers are composed of FeMn or MnPt. Preferably, the first high temperature annealing step is performed at a temperature of about 300° C. for from about 50 minutes to about 5 hours, with an applied external field of about 2000 Oe, the second high temperature annealing step is performed at a temperature of about 250° C. for a duration of about 1 hour, with an applied external field of about 2000 Oe, and a third high temperature annealing step is performed at a temperature of about 250° C. for a duration of about 4 hours, with no applied external field after completion of the second high temperature annealing step.

In accordance with another aspect of this invention, a dual stripe, magnetoresistive head comprises a first ferromagnetic strips on a substrate, and a first antiferromagnetic pinning layer over a portion of the first ferro-magnetic stripe, the first antiferromagnetic pinning layer being composed of a first material magnetized in a first direction. There is an intermediate non-magnetic layer over the strips and the pinning layer. A second ferro-magnetic stripe overlies the intermediate non-magnetic layer and there is a second antiferromagnetic pinning layer over a portion of the second ferromagnetic strips, the second antiferromagnetic pinning layer being composed of the first material, the second pinning layer being magnetized in a direction antiparallel to the first magnetic field. Preferably, the first and second magnetoresistive stripes are composed of NiFe, and the first and second antiferromagnetic pinning layers are composed of a material selected from the group consisting of FeMn, MnPt, MnPdPt, and NiMn, wherein Hpin for the first stripe is about 287 Oe and Hc is about 177 Oe and Hpin/Hc is about 1.62, and Hpin for the second stripe is about 227 Oe and He is about 35 Oe and Hpin/Hc is about 6.5.

An advantage of this method is that the same antiferromagnetic material with high blocking temperature, e.g. NiMn or MnPt can be used in the applications where the magnetization directions of the two exchange-coupled layers need to be set at various angles between them.

The invention teaches an anti-parallel exchange biased DSMR device with two annealing steps to set two exchange bias layers in different directions.

Another advantage of this invention is that the third annealing step increases the pinning field of the second MR strip and restores the pinning field of the first MR strip.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1A:
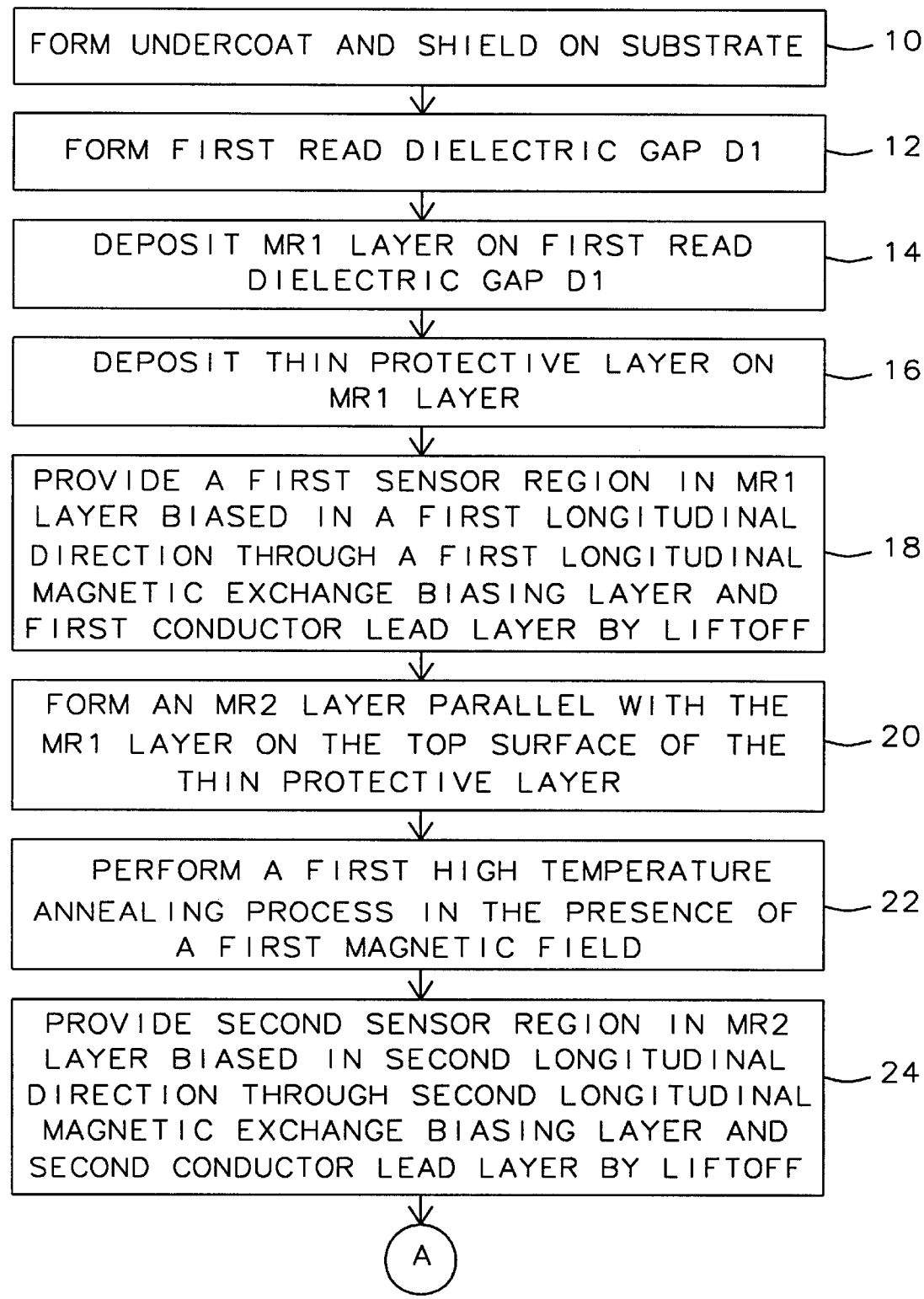
FIGS. 1A and 1B show a flow chart of a sequence of steps in accordance with the method of this invention.
Figure 1B:
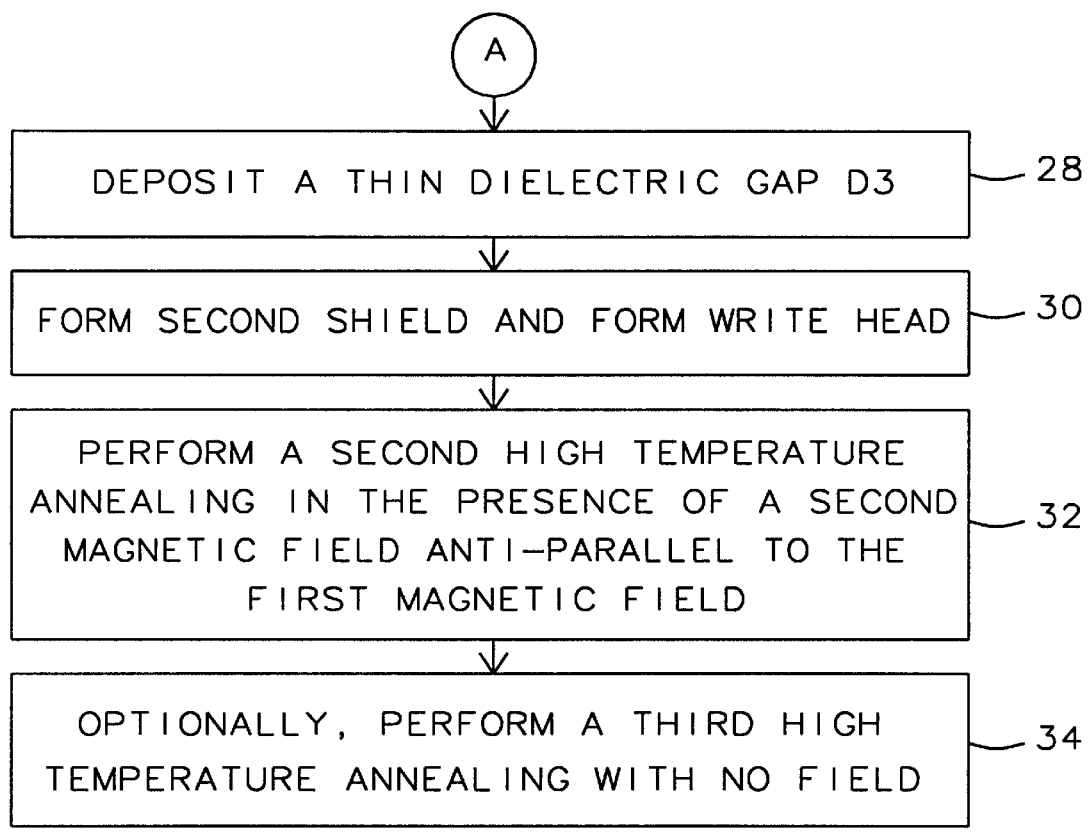

FIGS. 1A and 1B show a flow chart of a sequence of steps in accordance with the method of this invention. This produces an anti-parallel magnetization or an anti-parallel exchange bias for the MR layers in a DSMR head using the same antiferromagnetic (AFM) material composed of alloys such as Nickel/Manganese (NiMn), Manganese/Platinum (MnPt), etc. The method produces a high density, high data rate Dual-Stripe MagnetoResistive (DSMR) head with an anti-parallel exchange biased DSMR configuration. This method produces a DSMR head with a uniform cross-track bias profile and a higher signal amplitude especially for narrow Track Width (TW) applications.

The reason to use the same antiferromagnetic (AFM) materials for both stripes composed of alloys of such as NiMn, MnPt, etc., is that the exchange coupling field is strong and the blocking temperature is high, which are desirable characteristics for longitudinal stability of the DSMR device.

This invention provides a fabrication method for providing an antiparallel magnetization state between two magnetoresistive (MR) stripes in a DSMR device while maintaining a large Hex/Hc ratio of one MR stripe. This is needed to allow for a large process window for initialization.

Figure 2:
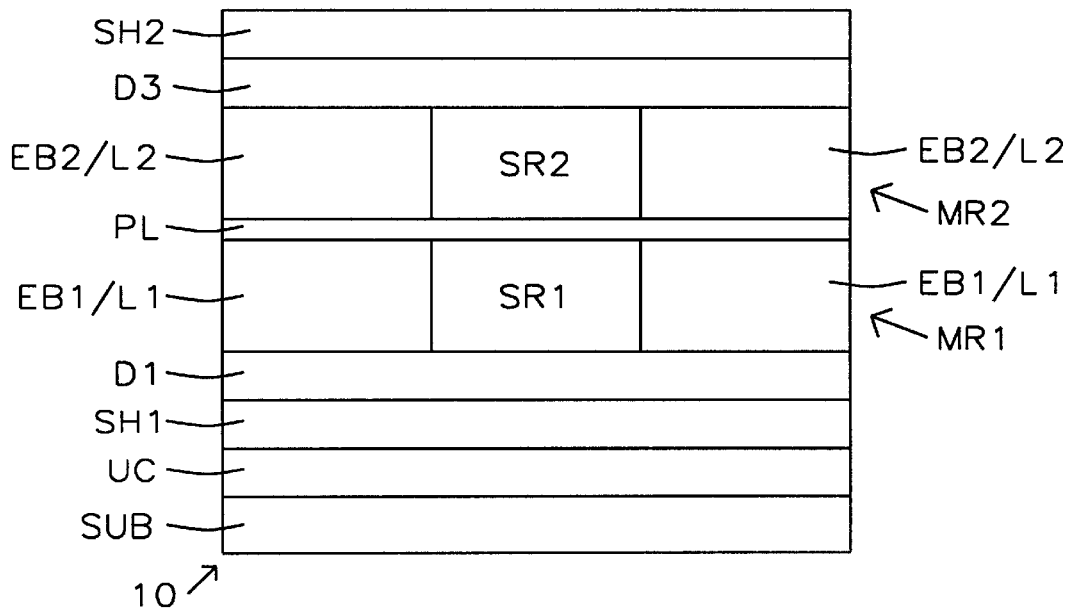
FIG. 2 is a sectional view of a device manufactured in accordance with the method of FIGS. 1A and 1B.

FIG. 2 is a sectional view of a device manufactured in accordance with the method of FIGS. 1A and 1B. A substrate SUB is formed of a material such as aluminum oxide ($Al_2O_3$).

On the substrate SUB, an undercoat layer UC is deposited. On the undercoat layer UC is deposited a magnetic shield layer SH1 formed of the alloys Nickel/Iron (NiFe) or Cobalt/Zirconium/Hafnium/Niobium (CoZrHfNb).

A first read dielectric gap layer D1 is formed over the shield layer SH1. Layer D1 is formed of a material such as aluminum oxide ($Al_2O_3$).

A first magnetoresistive (MR) layer MR1 composed of NiFe alloy is formed on the surface of the dielectric gap layer D1.

Exchange bias first antiferromagnetic pinning regions EB1 are composed of a material selected from the group of nickel manganese (NiMn), manganese palladium platinum (MnPdPt) and manganese platinum (MnPt).

U.S. Pat. Nos. 5,406,433 and 5,684,658 illustrate connections of exchange bias (AFM) layers and the leads such as sketch for the AFM Dinning regions EB1 and EB2 and the leads L1 and L2.

A thin protective layer PL is formed on the surface of the first MR layer MR1, preferably composed of an electrically insulating material such as aluminum oxide (Al2/O3), or a highly resistive layer. The thin protective layer PL covers first MR layer MR1, leads L1 and AFM pinning regions EB1.

A second MR layer MR1 composed of nickel iron alloy (NiFe) is formed on the surface of the protective layer PL.

Exchange bias first antiferromagnetic structures EB2 is composed of a alloy material selected from the group of nickel/manganese (NiMn), manganese/platinum (MnPt), and manganese/palladium/platinum (MnPdPt).

Again, U.S. Pat. Nos. 5,406,433 and 5,684,658 illustrate connections of exchange bias (AFM) layers and the leads such as sketch for the exchange bias (AFM) layers and the leads.

A thin dielectric gap layer D3 is formed on the surface of the layer MR2. The thin dielectric layer D3 covers second MR layer MR2, leads L2 and AFM pinning region EB2.

On the thin dielectric gap layer D3 is deposited a magnetic shield layer SH2 formed of NiFe alloy.

Figure 3:
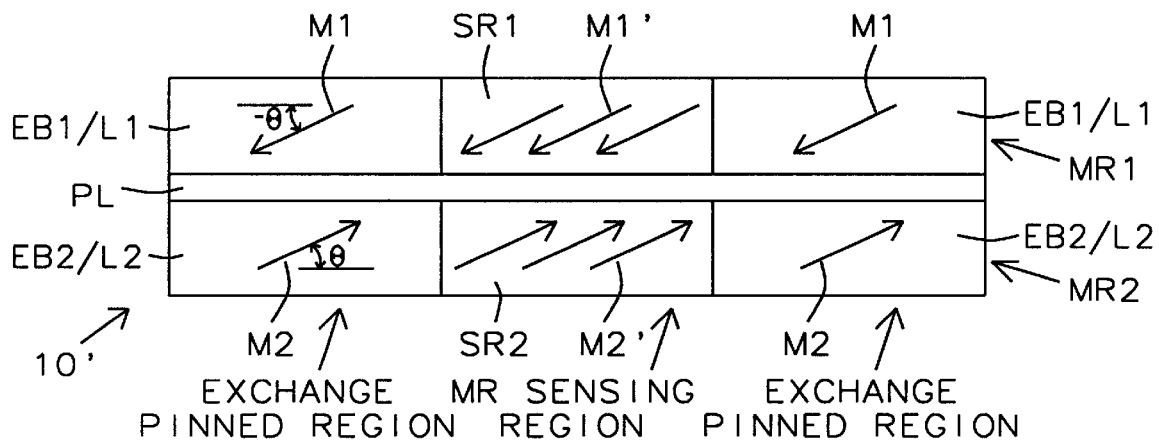
FIG. 3 shows an anti-parallel magnetization structure in a DSMR head (inverted with respect to FIG. 2), with two MR stripes each having an MR sensing region and exchange bias regions and leads on the ends.

FIG. 3 shows an anti-parallel magnetization structure in a DSMR head 10' (which is inverted with respect to FIG. 2), with MR stripes MR1 and MR2 with MR sensing regions and exchange bias regions EB1 and EB2 on the ends.

In MR stripe MR1, there is a magnetization M1 in Dinning regions EB1 in a longitudinal direction at an angle—Θ relative to the horizontal (X) axis and a corresponding magnetization M1' at the same angle—Θ in the first sensor region SR1 as in the AFM exchange bias pinning regions EB1.

In MR stripe MR2, there are magnetization M2 in pinning regions EB2 in a longitudinal direction at an angle Θ, in the opposite direction relative to the horizontal (X) axis and a corresponding magnetization M2' at the same angle Θ in the second sensor region SR2, as in the pinning regions EB2.

Figure 4:
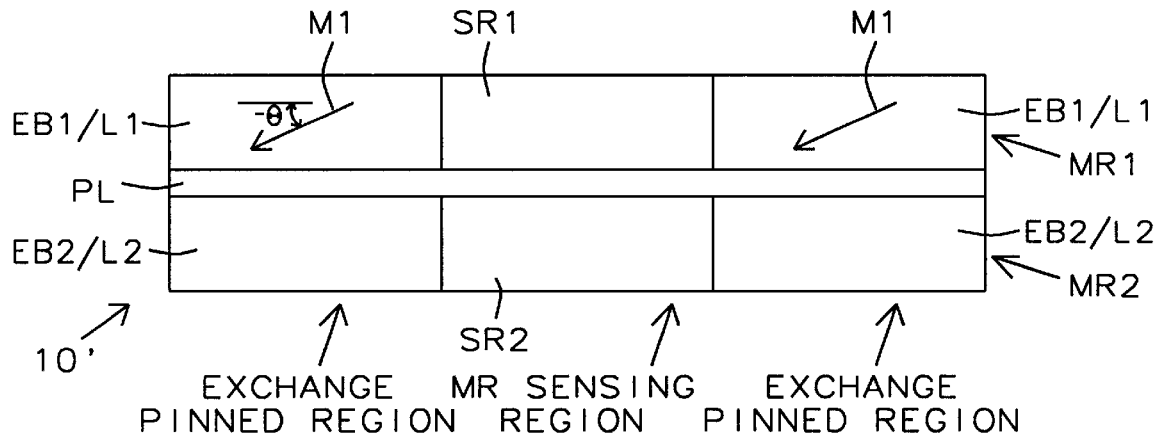
FIG. 4 shows the device of FIG. 3, but in an early stage of manufacture with a magnetization M1 in the set of exchange pinned regions of the first MR stripe after the first annealing step.

FIG. 4 shows the device 10' of FIG. 3, but in an early stage of manufacture with a magnetization M1 in the set of exchange pinned pinning regions EB1 after the first annealing step. There is magnetization in the sensor region SR1.

Figure 5:
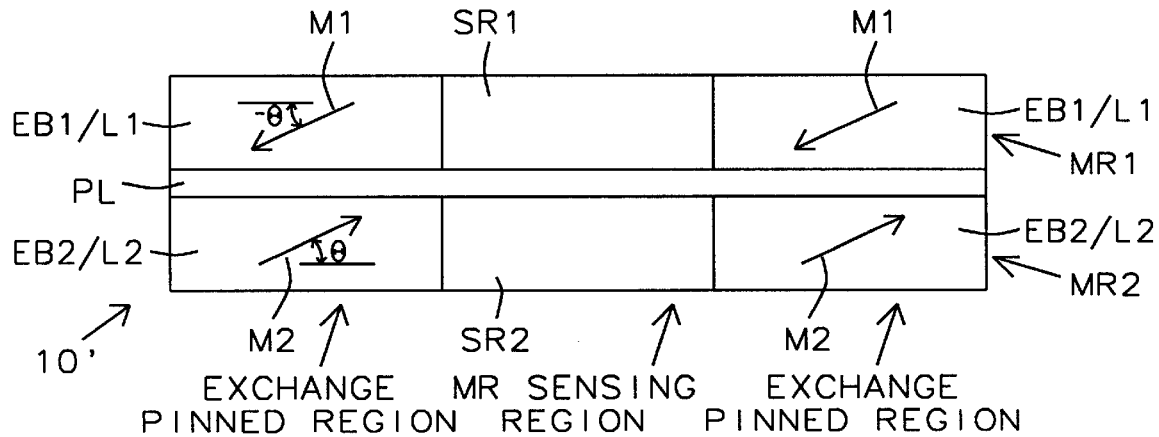
FIG. 5 shows the device of FIG. 4, in a later stage of manufacture with the added magnetization in the second set of exchange pinned regions after the second annealing step.

FIG. 5 shows the device 10' of FIG. 4, in a later stage of manufacture with the added magnetization M2 in the set of exchange pinned pinning regions EB2 after a second annealing step.

Referring to step 10 in FIG. 1A and to FIG. 2, the process starts with a planar substrate SUB, preferably comprising a silicon wafer. First, an undercoat layer UC, preferably composed of carbon (C) is deposited upon the substrate SUB.

Then a shield layer SH1, preferably composed of NiFe alloy, is formed above the undercoat layer UC.

In step 12, a first read dielectric gap layer D1 is formed on the surface of shield layer SH1. The read dielectric gap layer D1 is preferably composed of alumina ($Al_2O_3$).

In step 14, a ferromagnetic first MR layer MR1, preferably composed of NiFe alloy, is deposited on top of a first read dielectric gap, D1 so that now the structure includes underneath structures of the first shield SH1, undercoat layer UC and substrate SUB.

In step 16, a protective layer PL comprising either a thin insulator is then deposited on the top of the first magnetoresistive (MR) layer MR1. Such a highly resistive layer is composed of alumina ($Al_2O_3$).

In step 18 the first MR layer MR1 has a first sensor region longitudinally biased in a first longitudinal bias direction through a patterned first longitudinal magnetic exchange biasing antiferromagnetic layer EB1 and the combined first conductor lead layer L1 by a lift-off scheme. The first antiferromagnetic pinning regions EB1 are composed of a material selected from the group of nickel manganese (NiMn) manganese platinum (MnPt), etc.

In step 20, a second magnetoresistive (MR) layer MR2 is formed on the surface of the thin protective layer PL. The second magnetoresistive (MR) layer MR2 is parallel with and separated from the first magnetoresistive (MR) layer MR1 and layer MR2 is preferably composed of nickel iron alloy (NiFe), which is the same material as the first magnetoresistive (MR) layer MR1.

First High Temperature Annealing Step

In step 22, a first high temperature annealing step is used to create a strong exchange biasing in the first magnetoresistive (MR) layer with the presence of the first magnetic field, as shown by the arrows in FIG. 4. The first high temperature annealing step is performed at a temperature from about 280° C. to about 300° C. for a time from about 50 minutes to about 10 hours, with an applied field from about 500 Oe to about 2,000 Oe, preferably at 300° C. for from 50 minutes to 5 hours and an applied external field of about 2,000 Oe.

In step 24, in the second magnetoresistive (MR) MR2, a second sensor region SR2 of MR2 formed longitudinally magnetically biased in a second longitudinal bias direction through a patterned second longitudinal magnetic exchange biasing antiferromagnetic layer and the second conductor lead layer by a lift-off scheme. The second antiferromagnetic pinning regions EB2 are composed of a material selected from the group of nickel/manganese (NiMn) manganese/platinum (MnPt), etc.

In step 28, a thin dielectric layer is deposited to form the gap D3, preferably composed of a material such as alumina ($Al_2/O_3$).

In step 30, the second shield SH2 is deposited and a write head fabrication process is performed (not shown in FIG. 2).

Second Annealing Step

Referring to FIG. 5, and step 32 in FIG. 1B, to create a strong exchange biasing in the second stripe MR2, a second high temperature annealing treatment is applied in the presence of the second magnetic field which is anti-parallel to the first magnetic field which was applied during the first annealing step. The final exchange bias pinning regions EB1 of first MR stripe MR1 are set along the first magnetic direction, while the exchange bias pinning regions in the second MR stripe MR2 set along the second field direction.

First Alternative, Second Annealing Step

The temperature of the second annealing step can be as high as the annealing e.g., 300° C., but the magnitude of the magnetic field is controlled to be smaller than the residual exchange coupling field at that specific second annealing temperature. In the experiments conducted, the magnetic field is controlled within 50 Oe to 120 Oe range. After the second annealing step, the majority of the exchange of first MR stripe MR1 is still toward the first magnetic direction.

Second Alternative, Second Annealing Step

In this alternative, the second high temperature annealing step is applied to create a strong exchange biasing in the second MR stripe MR2 in the presence of the second magnetic field which is anti-parallel to the first magnetic field during first annealing, shown in FIG. 5. The temperature of the second annealing step is controlled around 250° C. and with a field in 200–2000 Oe range.

In step 34, after a second field annealing step, a third high temperature annealing step is performed to cure the device by further increasing the pinning field of the second MR stripe MR2 and providing for the recovery of the the exchange biasing of second MR stripe MR2 by restoring the pinning field of the first MR stripe MR1 to a far higher level. The third high temperature annealing step is performed in the absence of a magnetic biasing field, i.e. with no external magnetic field applied at a temperature of about 250° C. to increase the pinning field of the second sensor region SR2 of the second MR stripe MR2 and to restore the pinning field of the first sensor region SR1 of the first MR stripe MR1.

FIG. 5 illustrates the desired magnetization states of the stripes MR1 and MR2 in a DSMR device 10' with an exchange pinned region EB2 after the second annealing step 32 in FIG. 1B in accordance with this invention.

Figure 6:
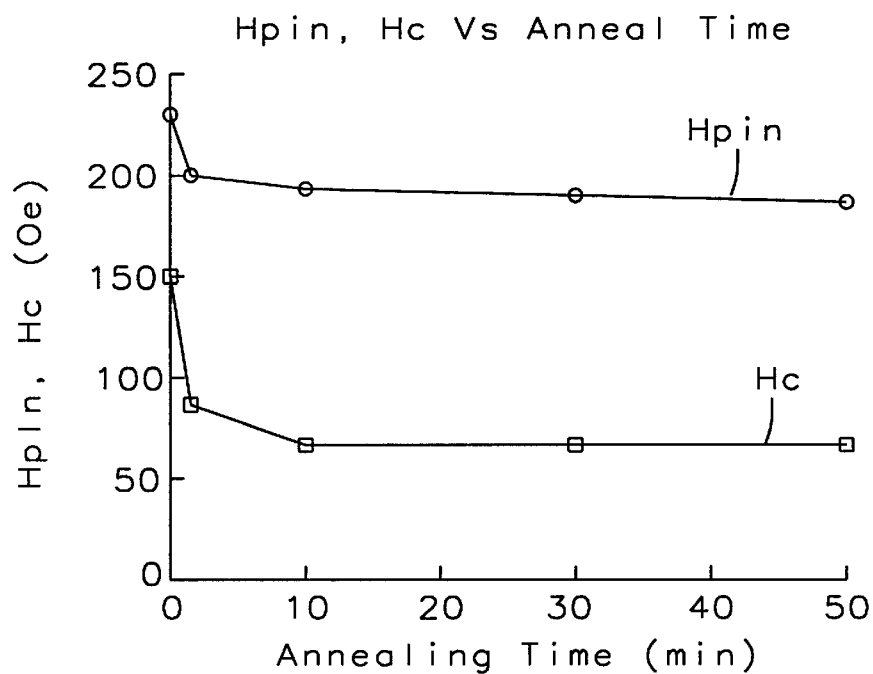
FIG. 6 is a graph of Hpin, Hc vs. annealing time showing the effect of the opposing field annealing step on Hpin and Hc and illustrating the effect on the exchange field and coercivity of MR1/NiMn, which has been through initial annealing step with an opposing field as in FIG. 1B.

FIG. 6 is a graph of Hpin, Hc vs. Anneal time which shows the effect of the opposing field annealing step on Hpin and Hc and which illustrates the effect on the exchange field and coercivity of MR1/NiMn, which has been through an initial annealing step at a temperature of 300° C. for a duration of eight (8) hours in step 22 in FIG. 1A, after annealing at a temperature 300° C. with an opposing field of 100 Oe in step 32 in FIG. 1B.

FIG. 6 clearly shows that the Hpin exchange field of sample #1 reduces from 230 Oe to 180 Oe after 50 min. of an opposing field annealing step, and Hc is reduced from 150 Oe to 60 Oe after 50 min. However, for data (not shown) the exchange field Hpin of sample #2 is at 160 Oe.

Figure 7:
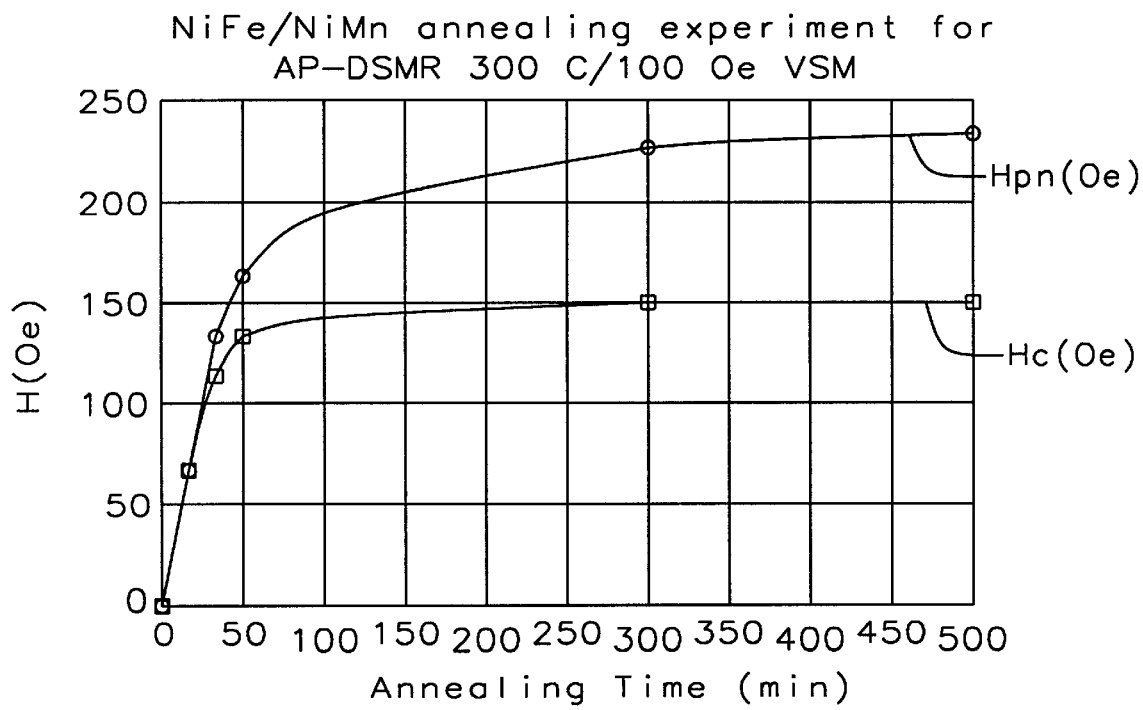
FIG. 7 is a graph of exchange field Hpn and coercivity Hc (Oe) vs. annealing time for annealing a DSMR MR/EB (NiFe/NiMn) device.

FIG. 7 is a graph for a DSMR MR/EB (NiFe/NiMn) of an annealing experiment of exchange field Hpn and coercivity Hc (Oe) vs. annealing time (minutes) illustrating that during application of a 300° C./100 Oe field the exchange field strength of the sample #2 increases as the annealing time increases as shown in FIG. 7.

data in Table I clearly show that the exchange field strength Hpin of the MR1 declines very sharply from 260 Oe to 6 Oe after exposure for one (1) hour to an opposing field annealing step at 250° C. with an applied field of 2000 Oe. However, after curing the device in a "no field" annealing step at a temperature of about 250° C. for about four (4) hours, the exchange field of MR1 recovers (increases) back to about 287 Oe. The exchange field strength Hpin of MR2 after 250° C., 2000 Oe, during a one (1) hour annealing step is about 10 Oe and it is further increased by annealing for four (4) hours with no field at 250° C. to about 227 Oe. It is noted that the final coercivity of the MR2 is about 35 Oe with a Hpin/Hc ratio of 6.5, which is very desirable in setting the two DSMR sensors into an antiparallel magnetization state.

TABLE I

Hpin and Hc after each annealing step

| ANNEALING STEP | FM (NiFe) | AFM | CONDITIONS TEMP. | HRS | FIELD | Hpin (Oe) | Hc (Oe) | $\frac{Hpin}{Hc}$ |
|---|---|---|---|---|---|---|---|---|
| | | | FIRST SENSOR | | | | | |
| ONE | MR1 | NiMn | 300° C. | 5 | 2000 Oe | 260 | 106 | 2.45 |
| TWO | MR1 | NiMn | +250° C. | 1 | 2000 Oe | 6 | 213 | 0.03 |
| THREE | MR1 | NiMn | +250° C. | 4 | No Field | 287 | 177 | 1.62 |
| | | | SECOND SENSOR | | | | | |
| TWO | MR2 | NiMn | 250° C. | 1 | 2000 Oe | 10 | 20 | 0.50 |
| THREE | MR2 | NiMn | +250° C. | 4 | No Field | 227 | 35 | 6.50 |

The Hpn in FIG. 7 is for EB2 and Hpin in FIG. 6 is for EB1.

The coercivity approaches a maximum of nearly 150 Oe asymptotically near an annealing time of 300 minutes.

On the other hand, the exchange field and coercivity of sample #1 is reduced slightly with a longer annealing time. By controlling the annealing time and magnetic field of the second annealing step, the two MR stripes can be set with the desired anti-parallel state as shown in FIG. 3. The process window of resetting them into the anti-parallel state is wide enough to assure consistency in device performance.

Third Annealing Step

In the experiments conducted, the magnetic field for second annealing step is 2000 Oe. In the final step, the magnetization of the first exchange bias pinning region EB1 in the first MR sensor MR1 sensor is set along the first magnetic direction, while the magnetization in the second exchange bias region EB2 in the second MR sensor MR2 is set along the second, opposite field direction, i.e. antiparallel.

The coercivity of the exchange bias pinning region EB2 in the second MR sensor MR2 is very small which is highly desirable in setting of the antiparallel state of the magnetizations of the two exchange biased MR layers. One example is in the anti-parallel DSMR application. The other example is in an SVMR (Spin Valve MR) application, where the small Coercivity of the pinned layer may be desirable for a head operation.

Table I lists the exchange field and coercivity of MR1/NiMn and MR2/NiMn after different annealing steps. The While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly, all such changes come within the purview of the present invention and the invention encompasses the subject matter of the claims which follow.

Having thus described the invention, what is claimed as new and desirable to be secured by Letters Patent is as follows:

1. A dual stripe, magnetoresistive head comprising:

a first ferromagnetic stripe on a substrate, a first antiferromagnetic pinning layer over a portion of said first ferromagnetic strip, said first antiferromagnetic pinning layer being composed of a first material magnetized in a first direction, an intermediate non-magnetic layer over said strips and said pinning layer, a second ferromagnetic stripe on said intermediate non-magnetic layer, a second antiferromagnetic pinning layer over a portion of said second ferromagnetic stripe, said second antiferromagnetic pinning layer being composed of said first material, said second pinning layer being magnetized in a direction antiparallel to said first magnetic field, and Hpin/Hc for said second stripe is several times greater than Hpin/Hc for said first stripe.

2. A head in accordance with claim 1 wherein said first and second antiferromagnetic pinning layers are composed of an alloy material selected from the group consisting of FeMn, MnPt, NiMn, and MnPdPt.

3. A head in accordance with claim 1 wherein
said first and second magnetoresistive stripes are composed of NiFe alloy, and
said first and second antiferromagnetic pinning layers are composed of an alloy material selected from the group consisting of FeMn, MnPt, NiMn, and MnPdPt.

4. A dual stripe, magnetoresistive head in comprising:
a first ferromagnetic stripe on a substrate,
a first antiferromagnetic pinning layer over a portion of said first ferromagnetic stripe, said first antiferromagnetic pinning layer being composed of a first material magnetized in a first direction,
an intermediate non-magnetic layer over said stripe and said pinning layer,
a second ferromagnetic stripe on said intermediate non-magnetic layer,
a second antiferromagnetic pinning layer over a portion of said second ferromagnetic stripe, said second antiferromagnetic pinning layer being composed of said first material, said second pinning layer being magnetized in a direction antiparallel to said first magnetic field,
said first and second antiferromagnetic pinning layers are composed of an alloy material selected from the group consisting of FeMn, MnPt, NiMn, and MnPdPt,
Hpin for said first stripe is about 287 Oe and Hc is about 177 Oe and Hpin/Hc is about 1.62, and
Hpin for said second stripe is about 227 Oe and Hc is about 35 Oe and Hpin/Hc is about 6.5.

5. A dual stripe, magnetoresistive head comprising:
a first ferromagnetic stripe on a substrate,
a first antiferromagnetic pinning layer over a portion of said first ferromagnetic strip, said first antiferromagnetic pinning layer being composed of a first material magnetized in a first direction,
an intermediate non-magnetic layer over said stripe and said pinning layer,
a second ferromagnetic stripe on said intermediate non-magnetic layer,
a second antiferromagnetic pinning layer over a portion of said second ferromagnetic stripe, said second antiferromagnetic pinning layer being composed of said first material, said second pinning layer being magnetized in a direction antiparallel to said first magnetic field,
said first and second magnetoresistive stripes are composed of NiFe alloy, and
said first and second antiferromagnetic pinning layers are composed of an alloy material selected from the group consisting of FeMn, MnPt, NiMn, and MnPdPt,
Hpin for said first stripe is about 287 Oe and Hc is about 177 Oe and Hpin/Hc is about 1.62, and
Hpin for said second stripe is about 227 Oe and Hc is about 35 Oe and Hpin/Hc is about 6.5.

* * * * *